US012101637B2

(12) United States Patent
Panigrahi et al.

(10) Patent No.: US 12,101,637 B2
(45) Date of Patent: Sep. 24, 2024

(54) SYSTEMS AND METHODS FOR APPLICATION-AWARE DYNAMIC SLICING IN RADIO ACCESS NETWORK (RAN)

(71) Applicant: Tata Consultancy Services Limited, Mumbai (IN)

(72) Inventors: Bighnaraj Panigrahi, Bangalore (IN); Sumanta Patro, Bhubaneswar (IN); Hemant Kumar Rath, Bhubaneswar (IN); Shameemraj Nadaf, Bangalore (IN); Garima Mishra, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 339 days.

(21) Appl. No.: 17/672,991

(22) Filed: Feb. 16, 2022

(65) Prior Publication Data
US 2023/0037228 A1 Feb. 2, 2023

(30) Foreign Application Priority Data
Jul. 13, 2021 (IN) .............................. 202121031448

(51) Int. Cl.
H04W 16/10 (2009.01)
H04W 16/04 (2009.01)
H04W 24/08 (2009.01)

(52) U.S. Cl.
CPC ........... *H04W 16/10* (2013.01); *H04W 16/04* (2013.01); *H04W 24/08* (2013.01)

(58) Field of Classification Search
CPC ...... H04W 16/10; H04W 16/04; H04W 24/08
See application file for complete search history.

(56) References Cited

U.S. PATENT DOCUMENTS

2020/0313985 A1* 10/2020 Jayakumar .............. H04L 41/14
2021/0064965 A1*  3/2021 Pardeshi ................. A63F 13/79
(Continued)

FOREIGN PATENT DOCUMENTS

CN           107743100 B     11/2020
WO    WO-2018134684 A1 *  7/2018   ......... G06F 9/45558
(Continued)

OTHER PUBLICATIONS

Abbas et al., "Slicing the Core Network and Radio Access Network Domains through Intent-Based Networking for 5G Networks," Electronics, 9:1710 (2020).
(Continued)

*Primary Examiner* — Deepa Belur
(74) *Attorney, Agent, or Firm* — FINNEGAN, HENDERSON, FARABOW, GARRETT & DUNNER LLP

(57) ABSTRACT

Fifth generation and beyond (5G+) systems are expected to adopt new network architectures, services, and deployment schemes for compatibility with the latest technologies and end user's needs. With increase in user equipment (UE), also come variety of advanced applications and use-cases, wherein each application type has its own KPI requirements. Existing resource allocation schemes in cellular networks are not able to handle such dynamic requirements due to which network slice can lead to unwanted mismanagement of resources. Present application provides systems and methods for application-aware dynamic slicing in radio access network (RAN), wherein RAN slicing is proactively managed by learning historical slice demands and consumptions. Once slices are created, the system allocates resources to user equipment by following optimal inter-slice and intra-slice mechanisms based on application type(s), traffic demand(s) and wireless characteristics of UE. Upon (Continued)

resource allocation the UE are further monitored to avoid resource misutilization and resource wastage.

20 Claims, 11 Drawing Sheets

(56) References Cited

U.S. PATENT DOCUMENTS

| | | | | |
|---|---|---|---|---|
| 2021/0160147 | A1* | 5/2021 | Chou | H04L 43/0817 |
| 2021/0160153 | A1* | 5/2021 | Akman | H04W 28/24 |
| 2021/0352534 | A1* | 11/2021 | Tiwari | H04L 41/5009 |
| 2022/0038986 | A1* | 2/2022 | Soliman | H04W 40/246 |
| 2022/0210658 | A1* | 6/2022 | Lee | H04W 72/0453 |
| 2022/0377597 | A1* | 11/2022 | Kotaru | H04L 41/5051 |
| 2022/0385581 | A1* | 12/2022 | Delos Reyes | H04L 43/062 |
| 2023/0254196 | A1* | 8/2023 | Shim | H04J 11/0033 370/329 |
| 2023/0327962 | A1* | 10/2023 | Kattepur | H04W 28/0268 455/414.1 |

FOREIGN PATENT DOCUMENTS

| | | | | |
|---|---|---|---|---|
| WO | WO-2020086872 | A1 * | 4/2020 | G06N 3/0445 |
| WO | WO 2021/022764 | A1 | 2/2021 | |

OTHER PUBLICATIONS

Bouzidi et al., "Online based learning for predictive end-to-end network slicing in 5G networks," (2020).

Chochliouros et al., "Dynamic Network Slicing: Challenges and Opportunities," IFIP International Federation for Information Processing (2020).

Mazied et al., "Towards Intelligent RAN Slicing for B5G: Opportunities and Challenges," (2021).

Oladejo et al., "Latency-Aware Dynamic Resource Allocation Scheme for Multi-Tier 5G Network: A Network Slicing-Multitenancy Scenario," IEEE Access (2020).

Shen et al., "AI-Assisted Network-Slicing Based Next-Generation Wireless Networks," IEEE Open Journal of Vehicular Technology (2020).

Yan et al., "Intelligent Resource Scheduling for 5G Radio Access Network Slicing," IEEE Transactions on Vehicular Technology, 68(8):7691-7703 (2019).

* cited by examiner

SYSTEMS AND METHODS FOR APPLICATION-AWARE DYNAMIC SLICING IN RADIO ACCESS NETWORK (RAN)

PRIORITY CLAIM

This U.S. patent application claims priority under 35 U.S.C. § 119 to: India Application No. 202121031448, filed on Jul. 13, 2021. The entire contents of the aforementioned application are incorporated herein by reference.

TECHNICAL FIELD

The disclosure herein generally relates to slicing and allocation of radio access networks, and, more particularly, to systems and methods for application-aware dynamic slicing in Radio Access Network (RAN).

BACKGROUND

Network Slicing is a technique that enables dividing and combining physical, logical, and virtual resources in a network for various types of application traffics with varying Key Performance Indicator (KPI) demands. Each slice is an end-to-end tailored made entity that fulfills the applications' requirements. The Physical resources include Resource Blocks (RBs) in Radio Access Network (RAN), bandwidth in the core and transport, etc. Logical resources include protocol preferences, parameters associated with the protocols, etc. The virtual resources include computing resources such as virtual machines (VMs) and network function virtualizations (NFVs) in the RAN and Core side of the network. Though slices are defined end-to-end, slice creation and allocation need to be performed separately in RAN, Core, and Transport networks. These resources are reserved a priori for specific types of applications with a pre-defined KPI requirements. When actual traffic demands are required for different applications, these reserved resources are allocated to the users. However, if not managed appropriately, network slices can lead to mismanagement and hence wastage of resources due to over-fitting or under-fitting allocations.

SUMMARY

Embodiments of the present disclosure present technological improvements as solutions to one or more of the above-mentioned technical problems recognized by the inventors in conventional systems. For example, in one aspect, there is provided a processor implemented method for application-aware dynamic slicing in radio access network (RAN). The method comprises periodically obtaining, by a Network Slicing, Control, and Management System (NSCMS), (i) one or more uplink data requests associated with one or more user equipment, the one or more user equipment are connected to an enhanced node, and (ii) a list of available radio access network (RAN) resources; identifying, by the NSCMS, the one or more uplink data requests as one of a first demand request, or a second demand request to obtain one or more identified demand requests; and iteratively performing: dynamically slicing, by the NSCMS, one or more available RAN resources into a plurality of sliced RAN resources based on the one or more identified demand requests; allocating, by the NSCMS, the one or more user equipment on a corresponding sliced RAN resource from the plurality of sliced RAN resources; and monitoring, by the NSCMS, the plurality of sliced RAN resources to obtain information specific to performance degradation based on at least one of (i) allocation of the one or more available RAN resources, (ii) change in traffic pattern, and (iii) wireless characteristics, until one or more parameters associated with the plurality of sliced RAN resources reach a pre-defined threshold.

In an embodiment, the one or more user equipment comprises one or more applications.

In an embodiment, the one or more applications correspond to at least one of an enhanced mobile broadband (eMBB) application type, an ultra-reliable low latency (URLLC) application type, and a massive machine type communication (mMTC) application type.

In an embodiment, the first demand request comprises a predictive demand request, and wherein the second demand request comprises a real-time demand request.

In an embodiment, when the one or more identified demand requests are of the first demand request, the step of slicing, by the network slicing, control, and management unit, one or more available RAN resources into the plurality of sliced RAN resources is based on a historical sliced based dataset.

In an embodiment, the plurality of sliced RAN resources is one of an enhanced mobile broadband (eMBB) sliced resource, an ultra-reliable low latency (URLLC) sliced resource, or a massive machine type communication (mMTC) sliced resource.

In an embodiment, the step of allocating, by the NSCMS, the one or more user equipment on a corresponding sliced RAN resource from the plurality of sliced RAN resources is based on one or more key performance indicators (KPI) associated with an uplink data request of the one or more user equipment.

In an embodiment, the one or more user equipment are allocated on a corresponding sliced RAN resource from the plurality of sliced RAN resources based on an average KPI demand associated with a corresponding application type.

In an embodiment, the step of allocating, by the NSCMS, the one or more user equipment on a corresponding sliced RAN resource from the plurality of sliced RAN resources comprises: prioritizing at least a subset of user equipment corresponding to a specific application from the one or more user equipment having the one or more applications for allocation on the corresponding sliced RAN resource from the plurality of sliced RAN resources based on a KPI demand of the specific application corresponding to a user equipment.

In an embodiment, the one or more parameters associated with the plurality of sliced RAN resources comprise at least one of resource utilization, and resource wastage.

In another aspect, there is provided a Network Slicing, Control, and Management System (NSCMS) for application-aware dynamic slicing in radio access network (RAN). The system comprises a memory storing instructions; one or more communication interfaces; and one or more hardware processors coupled to the memory via the one or more communication interfaces, wherein the one or more hardware processors are configured by the instructions to: periodically obtain (i) one or more uplink data requests associated with one or more user equipment, the one or more user equipment are connected to an enhanced node, and (ii) a list of available radio access network (RAN) resources; identify the one or more uplink data requests as one of a first demand request, or a second demand request to obtain one or more identified demand requests; and iteratively perform: dynamically slice of one or more available RAN resources into a plurality of sliced RAN resources based on the one or more identified demand requests; allocate the one or more user equipment on a corresponding sliced RAN resource from the plurality of sliced RAN resources; and monitor the plurality of sliced RAN resources to obtain information specific to performance degradation based on at least one of (i) allocation of the one or more available RAN resources, (ii) change in traffic pattern, and (iii) wireless characteristics, until one or more parameters associated with the plurality of sliced RAN resources reach a pre-defined threshold.

In an embodiment, the one or more user equipment comprises one or more applications.

In an embodiment, the one or more applications correspond to at least one of an enhanced mobile broadband (eMBB) application type, an ultra-reliable low latency (URLLC) application type, and a massive machine type communication (mMTC) application type.

In an embodiment, the first demand request comprises a predictive demand request, and wherein the second demand request comprises a real-time demand request.

In an embodiment, when the one or more identified demand requests are of the first demand request, the step of slicing, by the network slicing, control, and management unit, one or more available RAN resources into the plurality of sliced RAN resources is based on a historical sliced based dataset.

In an embodiment, the plurality of sliced RAN resources is one of an enhanced mobile broadband (eMBB) sliced resource, an ultra-reliable low latency (URLLC) sliced resource, or a massive machine type communication (mMTC) sliced resource.

In an embodiment, the step of allocating the one or more user equipment on a corresponding sliced RAN resource from the plurality of sliced RAN resources is based on one or more key performance indicators (KPI) associated with an uplink data request of the one or more user equipment.

In an embodiment, the one or more user equipment are allocated on a corresponding sliced RAN resource from the plurality of sliced RAN resources based on an average KPI demand associated with a corresponding application type.

In an embodiment, the step of allocating, by the NSCMS, the one or more user equipment on a corresponding sliced RAN resource from the plurality of sliced RAN resources comprises: prioritizing at least a subset of user equipment corresponding to a specific application from the one or more user equipment having the one or more applications for allocation on the corresponding sliced RAN resource from the plurality of sliced RAN resources based on a KPI demand of the specific application corresponding to a user equipment.

In an embodiment, the one or more parameters associated with the plurality of sliced RAN resources comprise at least one of resource utilization, and resource wastage.

In yet another aspect, there are provided one or more non-transitory machine-readable information storage mediums comprising one or more instructions which when executed by one or more hardware processors cause a method for application-aware dynamic slicing in radio access network (RAN). The method comprises periodically obtaining, by a network slicing, control, and management system (NSCMS), (i) one or more uplink data requests associated with one or more user equipment, the one or more user equipment are connected to an enhanced node, and (ii) a list of available radio access network (RAN) resources; identifying, by the NSCMS, the one or more uplink data requests as one of a first demand request, or a second demand request to obtain one or more identified demand requests; and iteratively performing: dynamically slicing, by the NSCMS, one or more available RAN resources into a plurality of sliced RAN resources based on the one or more identified demand requests; allocating, by the NSCMS, the one or more user equipment on a corresponding sliced RAN resource from the plurality of sliced RAN resources; and monitoring, by the NSCMS, the plurality of sliced RAN resources to obtain information specific to performance degradation based on at least one of (i) allocation of the one or more available RAN resources, (ii) change in traffic pattern, and (iii) wireless characteristics, until one or more parameters associated with the plurality of sliced RAN resources reach a pre-defined threshold.

In an embodiment, the one or more user equipment comprises one or more applications.

In an embodiment, the one or more applications correspond to at least one of an enhanced mobile broadband (eMBB) application type, an ultra-reliable low latency (URLLC) application type, and a massive machine type communication (mMTC) application type.

In an embodiment, the first demand request comprises a predictive demand request, and wherein the second demand request comprises a real-time demand request.

In an embodiment, when the one or more identified demand requests are of the first demand request, the step of slicing, by the network slicing, control, and management unit, one or more available RAN resources into the plurality of sliced RAN resources is based on a historical sliced based dataset.

In an embodiment, the plurality of sliced RAN resources is one of an enhanced mobile broadband (eMBB) sliced resource, an ultra-reliable low latency (URLLC) sliced resource, or a massive machine type communication (mMTC) sliced resource.

In an embodiment, the step of allocating, by the NSCMS, the one or more user equipment on a corresponding sliced RAN resource from the plurality of sliced RAN resources is based on one or more key performance indicators (KPI) associated with an uplink data request of the one or more user equipment.

In an embodiment, the one or more user equipment are allocated on a corresponding sliced RAN resource from the plurality of sliced RAN resources based on an average KPI demand associated with a corresponding application type.

In an embodiment, the step of allocating, by the NSCMS, the one or more user equipment on a corresponding sliced RAN resource from the plurality of sliced RAN resources comprises: prioritizing at least a subset of user equipment corresponding to a specific application from the one or more user equipment having the one or more applications for allocation on the corresponding sliced RAN resource from the plurality of sliced RAN resources based on a KPI demand of the specific application corresponding to a user equipment.

In an embodiment, the one or more parameters associated with the plurality of sliced RAN resources comprise at least one of resource utilization, and resource wastage.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
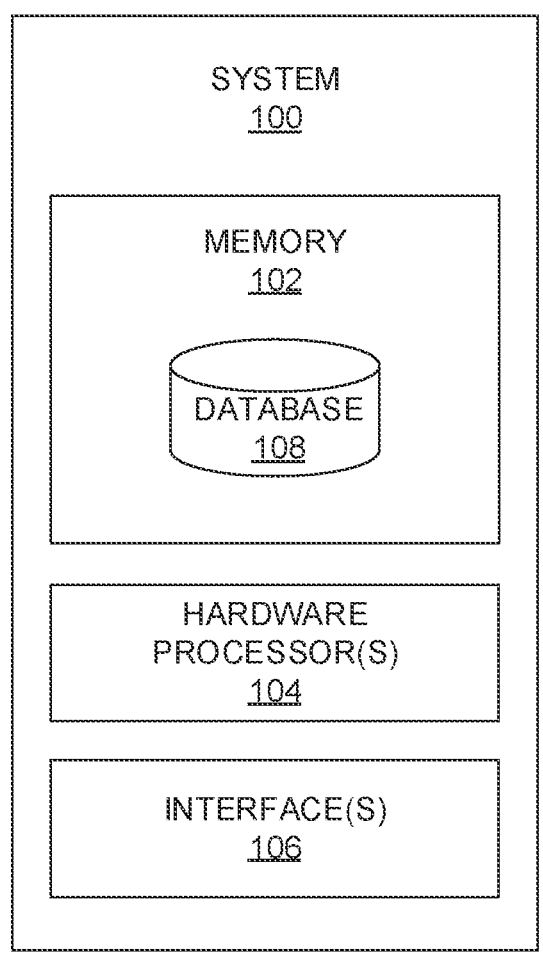
FIG. 1 illustrates an exemplary block diagram of a network slicing, control, and management system (NSCMS) for application-aware dynamic slicing and allocation of radio access network (RAN) resources, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Fifth generation and beyond (5G+) systems are envisioned to support millions of devices supporting numerous advanced applications and services. This necessitates to up-grade to enhanced architectures and protocols. As 5G+ is not only going to provide general services for the end users, but also planned to cut across most of the industry verticals for supporting specific applications. Network slicing allows operators to satisfy application specific requirements by orchestrating their resources. With efficient slicing, operators can serve different types of application requirements pertaining to various vertical use-cases.

The concept of slicing developed since early year 2000s, initially for fixed networks to accommodate different types of services and applications sharing the same physical infrastructures. Similar demands in applications of 5G mobile networks allowed the natural extension of the slicing concept to mobile networks. End-to-end slicing in 5G is spanned over the transport, packet CORE, and radio access networks (RAN).

RAN virtualization leads to reduced costs and increased energy efficiency by sharing common physical resources as slices. 5G Novel Radio Multiservice Adaptive Network Architecture (NORMA) project within 5G-PPP proposed the initial architectural aspects of 5G RN slicing by utilizing the concepts of Software Defined Networks (SDN) and Network Function Virtualization (NFV). Another gateway-based slicing approach was conventionally proposed wherein a controller provides application-based resource abstraction of the underlying RAN. 3rd Generation Partner Project (3GPP) introduced a capacity broker for managing on-demand slice resource allocation which is then evaluated extensively. Another research work explained a dynamic slicing scheme that schedules radio slice resources flexibly based on the Service Level Agreement (SLA). It maximizes the user rate applying one or more specific fairness criteria. Release 15 onwards, 3GPP standardization work is going on end-to-end management of network slicing across the different network functions e.g., Next Generation RAN (NG-RAN), 5G Core (5GC) and IP Multimedia Subsystem (IMS).

In another research work, authors explained utility maximization for networks where each logic link has multiple sub-links with different rate-reliability characteristics and further, authors incorporate rate, reliability, and delay into utility function, which reflects the various QoS requirements of different applications. Yet another research work proposed a network store which serves as a digital distribution platform where it includes programmable virtual network functions that enable 5G applications. In a further research work, authors proposed an Ultra High Definition (UHD) slice, wherein, it virtualizes physical resources to functionality of virtual network.

As traffic demands have time series data properties, appropriate prediction model allows a slice orchestrator to utilize the RAN resources more effectively. Hence, statistical and machine learning models received greater attention for forecasting time series have received significant attention in the literature. Some of the predictive models that can be appropriate in traffic demand use-cases are Auto Regressive Integrated Moving Average (ARIMA) and the Seasonal ARIMA (SARIMA) models. In a different approach, a research work advocated an admission control decision algorithm for RAN slice requests based on the knapsack problem. The solution of the problem was proposed as an online reinforcement learning algorithm.

Recent years have witnessed tremendous growth in wireless communication needs with very sophisticated application and service requirements. This growth in turn demands more complex infrastructure to cope with. Fifth generation and beyond (5G+) systems are expected to adopt new network architectures, services, and deployment schemes to become ultra-flexible and compatible with the latest technologies and end user's needs.

5G+ systems should support an exponential number of increased devices and variety of advanced applications and use-cases comes along with them. In terms of the overall requirements, the application types are segregated as enhanced Mobile Broadband (eMBB), massive Machine Type Communications (mMTC) and Ultra Reliable Low Latency Communications (URLLC) by the 3rd Generation Partnership Project (3GPP). Each of the application types has completely different set of KPI requirements. For example, where an URLLC type application has very stringent latency requirements, an eMBB type of application has moderate latency requirement but high data rate requirements. Hence, existing resource allocation schemes in cellular networks are not able to handle such dynamic requirements. Network slicing is the new 5G concept that addresses dynamically assigning and reserving resources for various types of traffics with variation in their KPI demands.

In network slicing, network resources from Radio Access Network (RAN) and CORE sides are reserved a priori (also referred as a-priori) for specific types of applications. When actual traffic demands come for different applications, these reserved resources are allocated to the users. However, if not managed properly, network slice can lead to unwanted mismanagement of resources. To avoid such mismanagement and wastage of resource utilization embodiments of the present disclosure provide an efficient network slice creation and management method. In particular, systems and methods are provided that implement a dynamic slice creation and management model for a 5G+ systems. More specifically, an efficient real-time and proactive slice creation mechanism is provided by the present disclosure to ensure optimized resource allocation by adapting Inter-slice as well as Intra-slice methods. In the present disclosure, a network slicing, control, and management system (NSCMS) is provided for creation and management of efficient slicing. The network slicing, control, and management unit may also be referred as network slicing, control, and management system (NSCMS) and may be interchangeably used herein. NSCMS periodically collects resource demands as well as resource available data from a client module which is a part of 5G evolved Node B (gNB). For real-time or predictive scheme, NSCMS creates optimal slices by considering key performance indicator (KPIs) of the incoming user applications. After slices are created for individual applications, NSCMS optimally allocates various application users on to created slices by intra and inter slice fitting. The method of the present disclosure is well supported by rigorous simulation results with various configuration scenarios.

Referring now to the drawings, and more particularly to FIGS. 1 through 7B, where similar reference characters denote corresponding features consistently throughout the figures, there are shown preferred embodiments and these embodiments are described in the context of the following exemplary system and/or method.

FIG. 1 illustrates an exemplary block diagram of a network slicing, control, and management system (NSCMS) 100 for application-aware dynamic slicing and allocation of radio access network (RAN) resources, in accordance with an embodiment of the present disclosure. In an embodiment, the network slicing, control, and management system (NSCMS) may also be referred as system, slicing, control and manage (SCM) or network slicing, control, and management unit (NSCMU), and may be interchangeably used herein. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting several devices to one another or to another server.

The memory 102 may include any computer-readable medium known in the art including, for example, volatile memory, such as static random-access memory (SRAM) and dynamic random access memory (DRAM), and/or non-volatile memory, such as read only memory (ROM), erasable programmable ROM, flash memories, hard disks, optical disks, and magnetic tapes. In an embodiment a database 108 can be stored in the memory 102, wherein the database 108 may comprise, but are not limited to one or more uplink data requests associated with one or more user equipment connected an enhanced node, and (ii) a list of available radio access network (RAN) resources, slicing and allocation information, change in traffic pattern in network, associated wireless characteristics, and the like. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
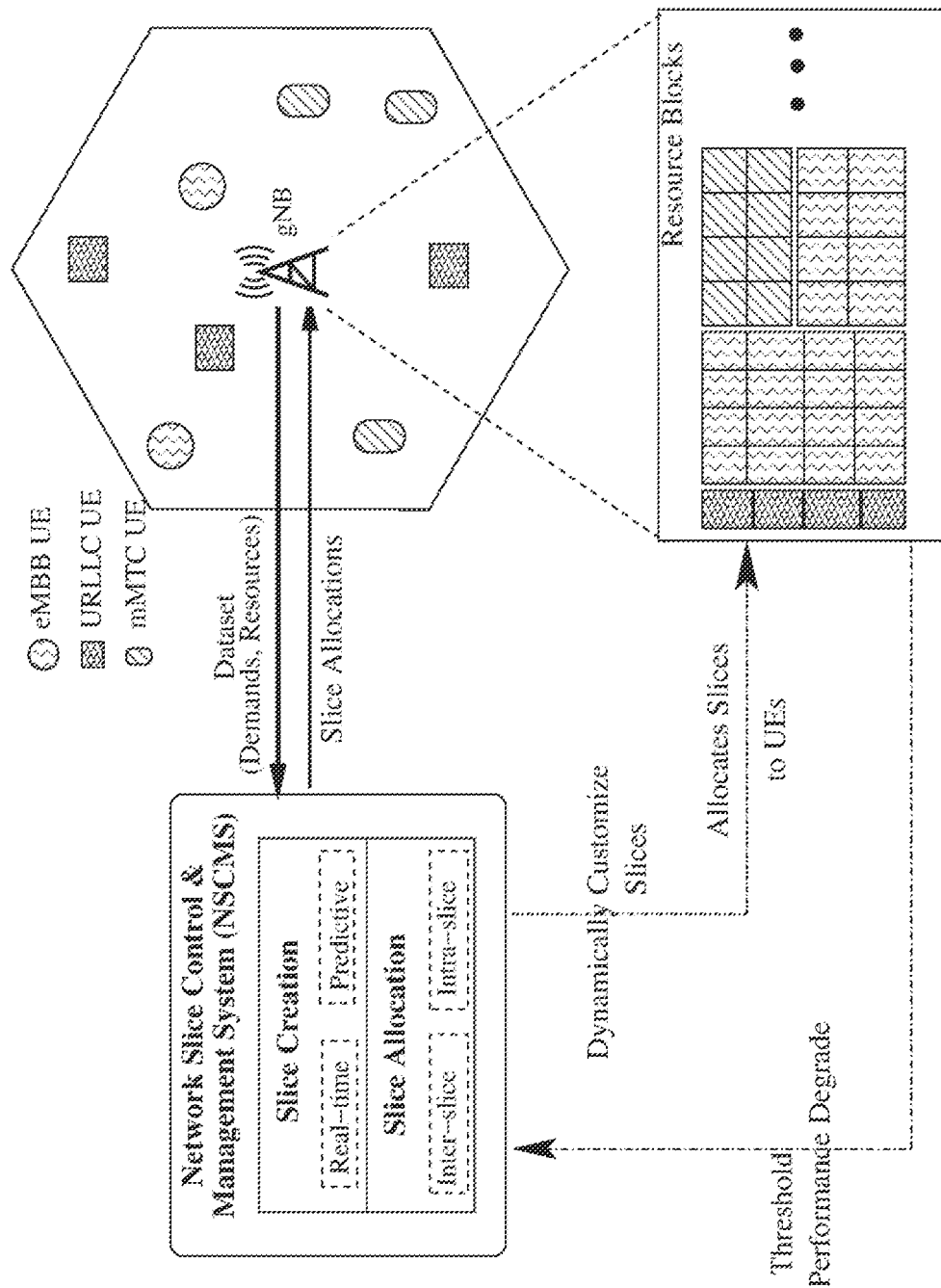
FIG. 2 illustrates a functional architecture of the network slicing, control, and management system (NSCMS) of FIG. 1 for application-aware dynamic slicing and allocation of radio access network (RAN) resources, in accordance with an embodiment of the present disclosure.

FIG. 2, with reference to FIG. 1, illustrates a functional architecture of the network slicing, control, and management system (NSCMS) 100 of FIG. 1 for application-aware dynamic slicing and allocation of radio access network (RAN) resources, in accordance with an embodiment of the present disclosure.

Figure 3:
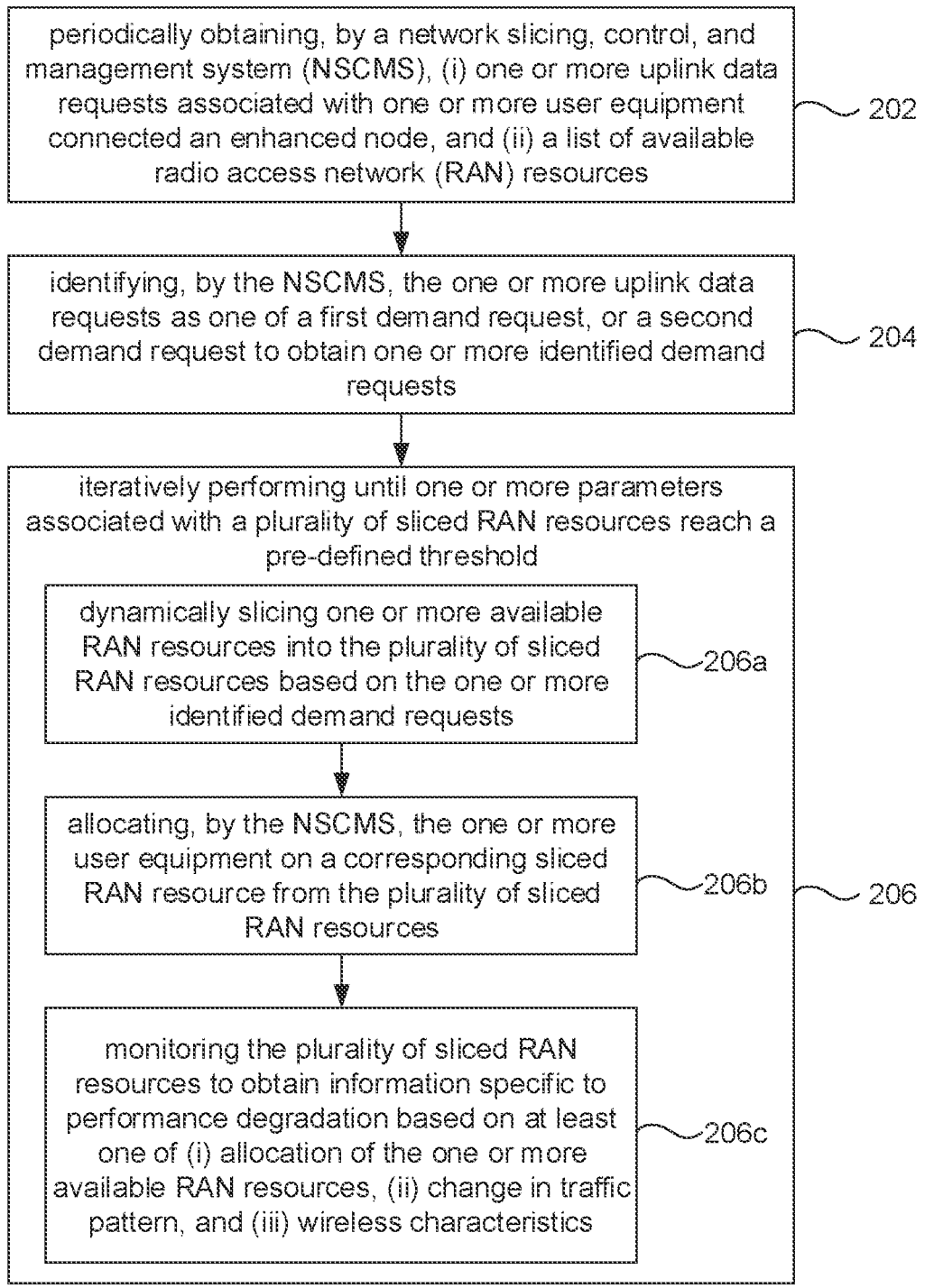
FIG. 3 illustrates an exemplary flow diagram of a method for application-aware dynamic slicing and allocation of radio access network (RAN) resources using the system of FIG. 1 and the functional architecture of FIG. 2, in accordance with an embodiment of the present disclosure.

FIG. 3, with reference to FIGS. 1-2, illustrates an exemplary flow diagram of a method for application-aware dynamic slicing and allocation of radio access network (RAN) resources using the system 100 of FIG. 1 and the functional architecture of FIG. 2, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1, and the functional architecture of FIG. 2. In an embodiment of the present disclosure, at step 202, the one or more hardware processors 104 of the network slicing, control, and management unit (NSCMS) 100 periodically obtain (i) one or more uplink data requests associated with one or more user equipment connected an enhanced node, and (ii) a list of available radio access network (RAN) resources. The one or more user equipment comprises one or more applications wherein the one or more applications correspond to at least one of an enhanced mobile broadband (eMBB) application type, an ultra-reliable low latency (URLLC) application type, and a massive machine type communication (mMTC) application type. The above step 202 can be better understood by way of following description.

In a cellular network slicing three major stake holders are there: (i) Network Operators (NO)—they are the infrastructure providers including communication, computing, and storage resources, (ii) Network Slice Managers (NSM)—these are the modules responsible for the creation and management of slices, and (iii) Network Slice Users (NSU)—these are the end users who demand for resources and served with slices eventually. Slicing transforms the real network resources into logical network resources that are responsible to serve specific business purpose. An end-to-end slice comprises of required network resources starting from RAN and the CORE of the cellular infrastructure. In the present application, system and method implement a network slicing and management (NSM) module called, Slice Control and Manage (SCM) for the RAN slicing only.

In a cellular network, users or UEs are connected to the network through 5G enhanced Node B (gNB). Users can run one or more than one application which can be mapped to different service categories (sCATs) as eMMB, mMTC, URLLC type as per the standards. Based on the applications' requirements, the 5G network manager allocates resource(s) or slices to UEs. For this, gNB periodically collects data requests from the connected UEs. Since UEs can be hosting various types of applications as explained above, different types of Quality of Services or Key Performance Indicator (KPI) requirements in terms of bandwidth, latency, and reliability, etc., can be mapped to the applications.

Each of the sCATs are defined and distinguished by a set of Key Performance Indicators (KPIs) such as data rate, throughput, latency, reliability, etc. It is to be understood by a person having ordinary skill in the art or person skilled in the art that the above examples of KPIs shall not be construed as limiting the scope of the present disclosure. In a general workflow, User Equipment (UEs) requests for RAN resources to the gNB. The smallest unit of the RAN resource is termed as Physical Resource Block (PRB) which represents a fragment of frequency and time domain. UEs demand for resources with different KPIs as per the application demand and accordingly they fall under one of the three sCAT categories. For example, UE on which a YouTube® application is running requires relatively high data-rate connection with moderate latency whereas, a vehicular UE on which a V2I (Vehicle to Infrastructure) application is running demands for a moderate data-rate but low latency connection.

In an embodiment of the present disclosure, at step 204, the one or more hardware processors 104 of the network slicing, control, and management system (NSCMS) 100 identify the one or more uplink data requests as one of a first demand request or a second demand request to obtain one or more identified demand requests. In an embodiment, the first demand request comprises a predictive demand request, and the second demand request comprises a real-time demand request. The above step 204 is better understood by way of following description.

In normal scenarios, slices are created as and when required depending on the instantaneous or immediate future of traffic demands. However, there are scenarios where proactive/predictive slicing arrangements are necessary to smooth and delay-sensitive slice management. In proactive/predictive slicing user demands are forecasted by applying machine learning (ML) algorithms (e.g., as known in the art ML technique(s)) and reserve slices accordingly. The type of ML technique that can be applied for prediction depends on various factors such as historical sample set, variation in data, operating environment, etc. In this case users' demands are time-varying in nature and have patterns of demands pertaining to specific time periods of the day (weekdays/weekends). Hence, present disclosure enables the system 100 to apply the ML algorithms that can handle/manage the cyclicity (short-term repetitive changes), Seasonality (long-term-term repetitive cycle patterns) and Irregularities (deviations/noise) in the dataset while predicting.

The predictive model of using weights for historical samples can be explained as follows. The historical demand list is divided into training and testing data sets with a conservative split ratio of 70:30. In a window of k samples, $d_i^{t+1}$ is the predicted value at time t+1 given as:

$$d_i^{t+1} = \Omega + \Phi_1 d_i^{t+1} + \ldots \Phi_k d_i^{t-k} \quad (1)$$

$d_i$ is the demand for the user i $\Omega$ is a constant. $\Phi_s, s \in \{1, \ldots, k\}$ are the corresponding weights of the demand samples. The present disclosure tests two variants of time-series predictive models which best suit requirements for the slicing use-case:

1. ARIMA: Auto Regressive Integrated Moving Average (ARIMA) approaches within building a composite model of the time series. ARIMA models include parameters to account for season and trend (for instance, dummy variables for weekends or summer periods). The ARIMA model assumes that future values are a linear function of previously observed values and random noise. The ARIMA model can be modeled as ARIMA (p, d, q). By tuning of the parameters p, d, and q, prediction performance of ARIMA can be optimized.
2. SARIMA: Seasonal Autoregressive Integrated Moving Average (SARIMA) widens application of the ARIMA by including a linear combination of seasonal past values and/or forecast errors.

Referring to steps of FIG. 3, at step 206 of the present disclosure, the one or more hardware processors 104 of the NSCMS 100 iteratively perform a plurality of steps 206a through 206c until one or more parameters associated with a plurality of sliced RAN resources reach a pre-defined threshold. More specifically, at step 206a of the present disclosure, the one or more hardware processors 104 of the network slicing, control, and management system (NSCMS) 100 dynamically slice one or more available RAN resources into the plurality of sliced RAN resources based on the one or more identified demand requests. The plurality of sliced RAN resources is one of an enhanced mobile broadband (eMBB) sliced resource, an ultra-reliable low latency (URLLC) sliced resource, or a massive machine type communication (mMTC) sliced resource, in one embodiment of the present disclosure. The objective of this step is to appropriately create size-based slices for the users/user equipment according to demands of different user traffics. Creation of slices can be real-time or predictive depending upon the demand request type as mentioned above. While real-time instantaneous demands are considered for creating slices, predictive history of demands and slice consumption are used to predict slice proportions. In other words, when the one or more identified demand requests is of the type first demand requests (or predictive demand requests), the step of slicing the one or more available RAN resources into the plurality of sliced RAN resources is based on a historical sliced based dataset. It is assumed that the creation of slices and allocation of resources to users are performed in an observation cycle of f frames. For each cycle, let the total number of UEs be N and total number of resources be R.

Let $x_e$, $x_m$, and $x_u$ denote the total number of eMBB (e), mMTC (m) and URLLC (u) type of users/user equipment, respectively. Hence, $x_e + x_m + x_u = N$. Let $D_e$, $D_m$, and $D_u$ be the average total sum of demand fractions of e type, m type and u type users at time instance t, respectively in a given observation cycle.

$$D_e = \sum_{i=1}^{x_e} d_i; D_m = \sum_{j=1}^{x_m} d_j; \text{ and } D_u = \sum_{k=1}^{x_u} d_k \quad (2)$$

where, $d_i$, $d_j$ and $d_k$ are the demand fractions of $i^{th}$ eMBB user, $j^{th}$ mMTC user and $k^{th}$ uRLLC user/user equipment, respectively at time instance t. It is to be noted that it is called demand fraction because if the demand by a user is not completely fulfilled in a cycle, then a fraction of total demand is served in current cycle and remaining demand fraction is being carry forwarded to the next cycle. This process continues till the complete demand is served.

Similarly, let $R_e$, $R_m$, and $R_u$ be the ratio of resource slices created for eMBB, mMTC, and uRLLC slices, respectively. If total demand is D then the size of resource fractions for e type, m type and u type slices in a cycle are:

$$R_o \propto \frac{D_o}{D} \times R, \forall o \in \{e, m, u\} \quad (3)$$

Referring to steps of FIG. 3, at step 206b, of the present disclosure, the one or more hardware processors 104 of the NSCMS 100 allocate the one or more user equipment on a corresponding sliced RAN resource from the plurality of sliced RAN resources. The allocation of one or more user equipment on a corresponding sliced RAN resource from the plurality of sliced RAN resources is based on one or more key performance indicators (KPIs) associated with an uplink data request of the one or more user equipment. The KPIs are described above for reference. In an embodiment, the one or more user equipment is allocated on a corresponding sliced RAN resource from the plurality of sliced RAN resources based on an average KPI demand associated with a corresponding application type. In other words, the step of allocating, by the NSCMS, comprises allocating one or more application types (e.g., eMBB/URLLC/mMTC) of the one or more user equipment on a corresponding sliced RAN resource from the plurality of sliced RAN resources is based on an average KPI demand associated with a corresponding application type. This is referred to as inter slice allocation.

Further, the step of allocating the one or more user equipment on a corresponding sliced RAN resource from the plurality of sliced RAN resources comprises: prioritizing at least a subset of user equipment corresponding to a specific application from the one or more user equipment having the one or more applications for allocation on the corresponding sliced RAN resource from the plurality of sliced RAN resources based on a KPI demand of the specific application corresponding to a user equipment. For instance, eMBB device corresponding to an eMBB application may be prioritized from the one or more user equipment having the one or more applications for allocation on the corresponding sliced RAN resource from the plurality of sliced RAN resources based on a KPI demand of the eMBB application corresponding to the eMBB device. This is referred to as intra slice allocation.

The above step 206b of slice allocation including the inter slice allocation and intra slice allocation may be better understood by way of following description:

Once slices are created the task for the system 100 is to fill it with UE's data. During packing of the slices there are possibilities of overfitting—smaller size of a slice type than actual demands for that slice and under-fitting—larger slice created for a lesser traffic type. Both the cases lead to under-utilization of resources. To mitigate the resource under-utilization, embodiments of the present disclosure enable the system 100 to perform inter slice allocation and intra slice allocation.

Inter-Slice Allocation:

Inter-slice Allocation helps avoid mismanagement of resources among the various sCATs. Given a frame of resources, inter-slice allocation optimally decides which sCAT needs to be scheduled as per their KPI requirements. Once the slices patterns are decided, the task now is to arrange these slices on actual resources. This scheduling of slice blocks depends on the incoming demands and scheduling logic. Slice block size decided for a specific slice type may be scheduled as a whole or can be further subdivided into smaller blocks and arranged in multiple places in the frame. It may be assumed that the actual user demands always exceeds the available resources, optimal resource mapping among slices is defined as the following optimization problem:

$$\text{maximize } Z = \frac{1}{1 + [R - (D_e + D_u + D_m)]} \quad (4a)$$

$$\text{subject to} \quad (4b)$$

$$R - (D_e + D_u + D_m) \geq 0$$

Where, Z defines the resource utilization factor. The constraint bounds the sum of individual resources by the total resource available. The optimization problem is difficult to solve as the system is spanned over multiple trains of resource frames and the function changes in every observation cycle. However, heuristic allocation schemes can be implemented to achieve near optimal solution. In the present disclosure, the following heuristic allocation schemes are implemented and compared by the system 100 of the present disclosure.

a) Round-Robin: In this type of allocation, all three types of slices are scheduled in a Round-Robin fashion. Advantage of this scheme is all have equal priority to be selected first. However, delay sensitive URLLC slices do not get priority and hence may not meet the required KPIs.

b) KPI-Aware: This allocation schedules users based on the KPI. Depending on the selected KPI or set of KPIs, it selects the user/UE with highest KPI and allocate. In the present disclosure, latency is considered as the KPI parameter. Most of the URLLC type application have very stringent low latency requirements. To provide lower RAN response time KPI-Aware scheme arranges delay sensitive slices on priority. In this method, slices are scheduled with low to high values of average user delay KPI requirement of users. Note that, instead of latency, it can be customized with other KPI aware priority scheduling.

Intra-Slice Allocation:

Once a slice block pertaining to a specific sCAT is scheduled in a frame, users/UEs attempting for that slice are scheduled using intra-slice scheduling algorithm. Optimal resource allocation within a slice is defined as the following optimization problem:

$$\text{minimize } R_o - D_o, \forall o \in \{e, m, u\} \quad (5a)$$

subject to $$R_o - D_o \geq 0, \forall o \in \{e, m, u\} \quad (5b)$$

Below Table 1 depicts exemplary values average KPI demand for a corresponding an application type, and user equipment/device.

TABLE 1

| Use case | Slice category | Type | KPI-1 (packet loss rate/reliability) | KPI-2 (latency) |
|---|---|---|---|---|
| Smartphone | eMBB | 1 | 0.01 | 100 ms |
| Smartphone | eMBB | 2 | 0.000001 | 300 ms |
| Healthcare | URLLC | 1 | 0.000001 | 10 ms |
| V2V | URLLC | 2 | 0.000001 | 20 ms |
| Industry 4.0 | mMTC | 1 | 0.001 | 50 ms |
| Smart city and Homes | mMTC | 2 | 0.001 | 300 ms |

Example of KPIs set for various slice types depending on the use cases is depicted in Table 1. The corresponding values of KPIs such as reliability and latency are set by the standardization association, 3rd Generation Partnership Project (3G PP). However, these values can be customized by service operators according to achieve better performance gain depending on various scenarios as mentioned below.

a. While setting the priority of a slice type (either eMBB, URLLC, or mMTC), the NSCMS calculates average KPIs of all users/user equipment belonging to each slice type. For example, assuming, there are 5 eMBB users with latency KPI values as 100 ms, 100 ms, 100 ms, 300 ms, 300 ms with average value as 180. Similarly, assuming that there are 4 URLLC users with average latency KPI of 10 ms, 10 ms, 20 ms, 20 ms is 15 ms.

b. For prioritizing among users in one specific slice type, the NSCMS 100 checks individual users' KPI values and then decides. For example, if there are 5 eMBB users with latency KPI requirement values as 100 ms, 100 ms, 300 ms, 300 ms, 300 ms, then both user (or UE) 1 and user (UE) 2 can be selected on priority followed by other users.

In one embodiment, the above allocation/prioritization (e.g., to solve Intra-slice allocation scheme), the system 100 uses Round-Robin, Proportional fair, and KPI-Aware heuristic algorithms. Below is an exemplary pseudo code for Inter-slicing technique as described by the present disclosure.

Pseudo code for Inter-slicing technique:
1. NSCMS has the total resources R
2. Let $D_e$, $D_m$, and $D_u$ be the average total sum of demand fractions of e type, m type and u type users, respectively in each observation cycle.
3. Divide R into three slice resources with each fraction proportional to respective average sum of demands ($D_e$, $D_m$, and $D_u$)
4. Schedule different slices on resource frames according to the allocation methods (either RR or KPI-aware) so that $$\frac{1}{1 + [R - (D_e + D_u + D_m)]}$$

is maximum and $R-(D_e+D_u+D_m) \geq 0$
5. The above steps 1 to 4 are continued/repeated till all the users/UE from all three slice types are allocated.

Below is an exemplary pseudo code for Intra-slicing technique as described by the present disclosure.

Pseudo code for Intra-slicing technique:
1. NSCMS has the total resources R
2. Let $D_e$, $D_m$, and $D_u$ be the average total sum of demand fractions of e type, m type and u type users, respectively in each observation cycle.
3. Divide R into three slice resources with each fraction proportional to respective average sum of demands ($D_e$, $D_m$, and $D_u$)
4. Schedule different slices on resource frames according to the allocation methods (either RR or KPI-aware) so that $$\frac{1}{1 + [R - (D_e + D_u + D_m)]}$$

is maximum and $R-(D_e+D_u+D_m) \geq 0$
5. Once a specific slice is scheduled, prioritize and schedule users/UE in that particular slice by using a scheduling method (either RR or KPI-aware) so that minimize $R_o-D_o, \forall o \in \{e, m, u\}$ and $R_o-D_o \geq 0, \forall o \in \{e, m, u\}$
6. The above steps 1 to 5 are continued/repeated till all the users/UE from all three slice types are allocated.

Referring to steps of FIG. 3, at step 206c, the one or more hardware processors 104 of the NSCMS 100 monitor the plurality of sliced RAN resources to obtain information specific to performance degradation based on at least one of (i) allocation of the one or more available RAN resources, (ii) change in traffic pattern associated thereof (also referred as change in traffic pattern of the resources, and (iii) wireless characteristics associated thereof (also referred as wireless characteristics of UE). For example, consider a scenario such as office(s), wherein in office hours there is a sudden surge in traffic in terms of number of eMBB (smartphone) application users. This leads to a required change in the individual slice sizes because, if an eMBB slice was created of size X, now it requires more to fulfill the additional surge. Consider another scenario, if there is a bad channel condition and due to bad channel condition, the reserved slice resource may not be sufficient and for same amount of data, it now requires a greater number of resources. In a nutshell, the method of the present disclosure enables User Equipment (UE) to request for RAN resources to the gNB. After collecting resource demands from all the UEs, gNB shares the demands list along with available resource list to the system 100. The system 100 then optimally create slices according to defined KPIs from each of the applications. Note that, in case of proactive/predictive slicing, gNB share historical dataset of user demands and slicing patterns. After creating slices SCM applies optimal allocation schemes ensuring intra-slice and inter-slice optimization. Once gNB receives information on slices and allocated users list, it schedules the user data onto slices accordingly. It may happen that due to dynamic traffic and wireless characteristics or other environmental dynamics performance of the resource allocation degrades. In such a case, gNB gives feedback to the NSCMS 100 based on the monitoring of the sliced RAN resources and its allocation. The NSCMS then repeats the process of slice creation and allocation.

Performance Evaluation:

To validate the slicing schemes as described in the present application and test their performance, the system 100 used a simulated environment using Python 3.9. In an embodiment, the expressions 'present application' may be referred to as 'present disclosure' and interchangeably used herein. In the simulated environment a cellular like scenario was created with a single gNB and multiple users/UE with different types of application requirements. The RAN resources are realized by following specifications (e.g., refer '3GPP, "Evolved Universal Terrestrial Radio Access Physical Channels and Modulation," 3rd Generation Partnership Project (3GPP), Technical Specification (TS) TS 36.211, 2011.'). Every frame consists of 10 sub-frames of 1 millisecond (ms) duration and each sub-frame contains 100 PRBs per Transmission Time Interval (TTI) (1 ms in LTE) considering a 20 MHz channel configuration. Instead of repeating the slice creation and allocation for each frame, a window of 4 frames was considered for slicing process. In other words, the slicing process repeats after 4 frames. Table 1 shows various configuration parameters and their values.

TABLE 1

| Parameters | Values |
| --- | --- |
| Total number of UEs | 20 |
| Total number of gNBs | 1 |
| UE distribution | Random |
| Channel Bandwidth | 20 MHz |
| Maximum resource blocks (RBs) per slot | 100 |
| Number of Sub-frames | 100 |

Figure 4A:
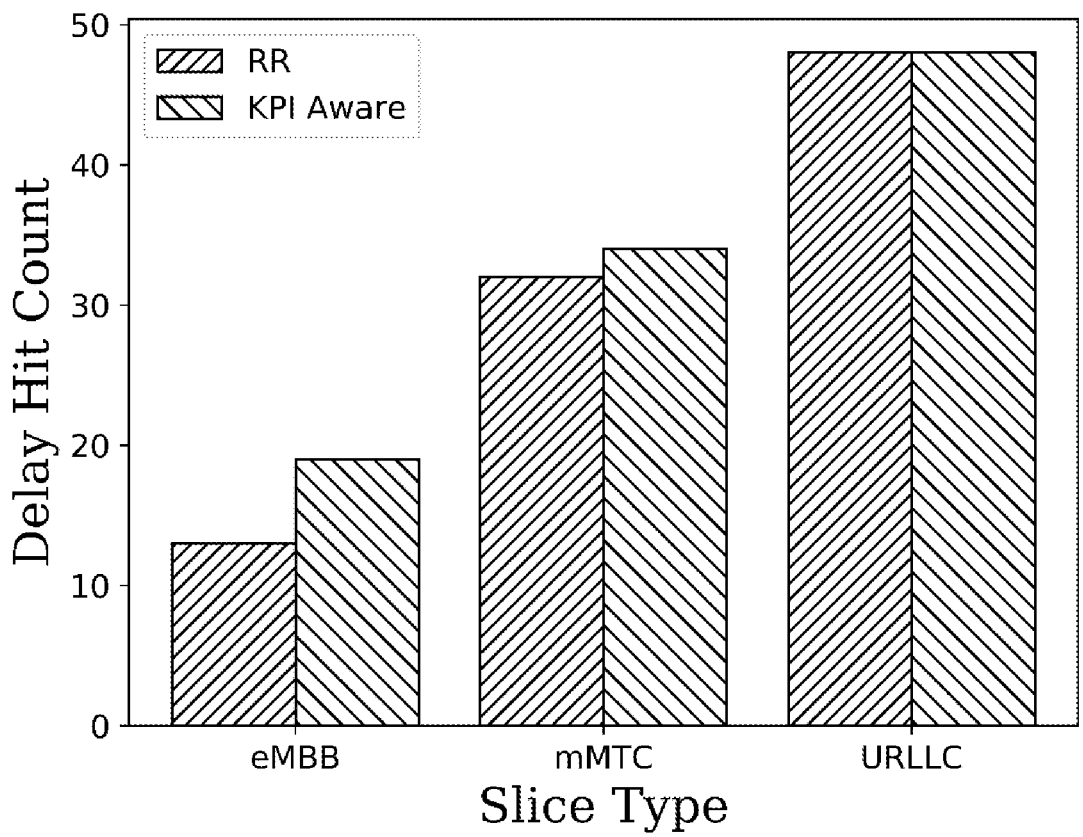
FIGS. 4A and 4B depict graphical representation illustrating delay hit and miss percentage for Round Robin (RR) and KPI-aware allocation schemes, in accordance with an embodiment of the present disclosure.
Figure 4B:
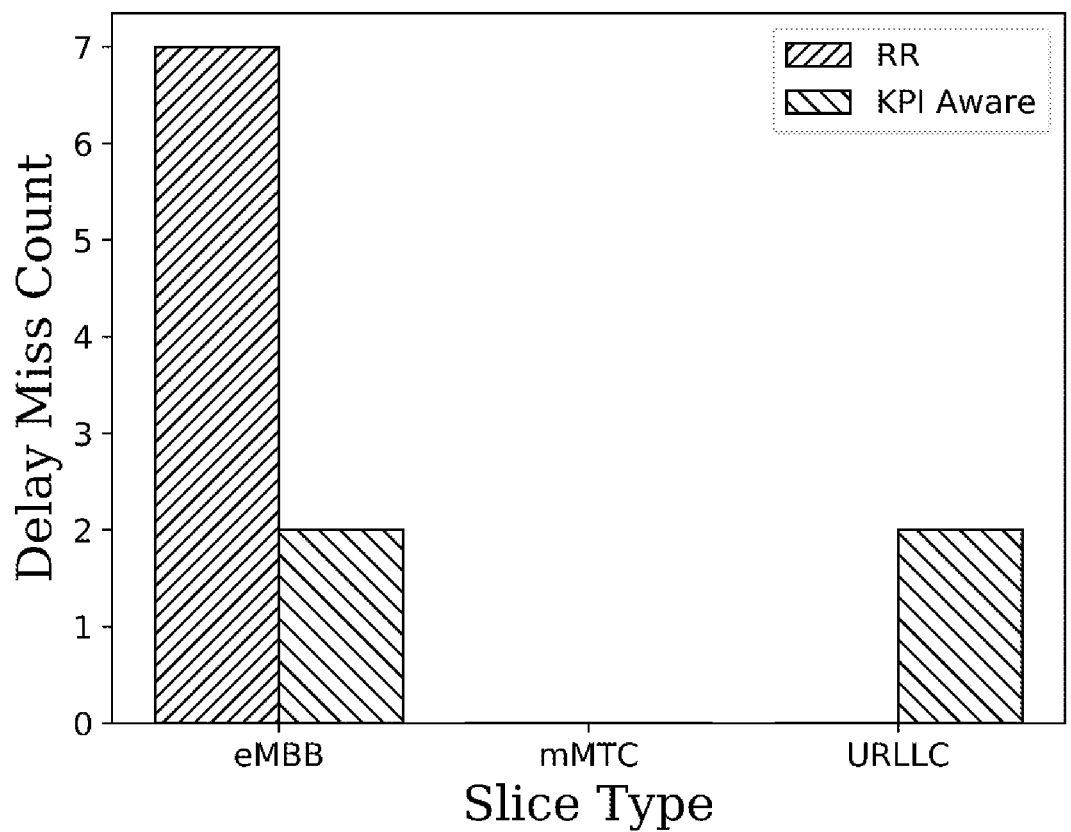
Figure 5A:
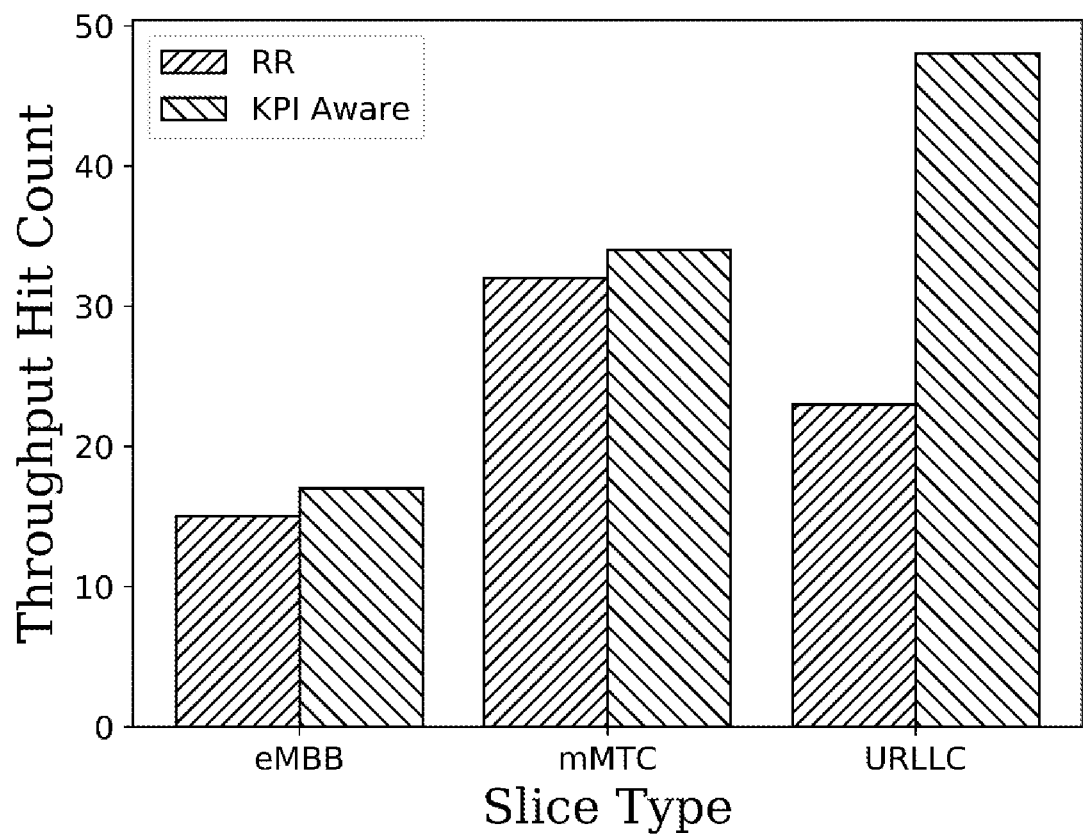
FIGS. 5A and 5B depict graphical representation illustrating throughput hit and miss percentage for Round Robin (RR) and KPI-aware allocation schemes, in accordance with an embodiment of the present disclosure.
Figure 5B:
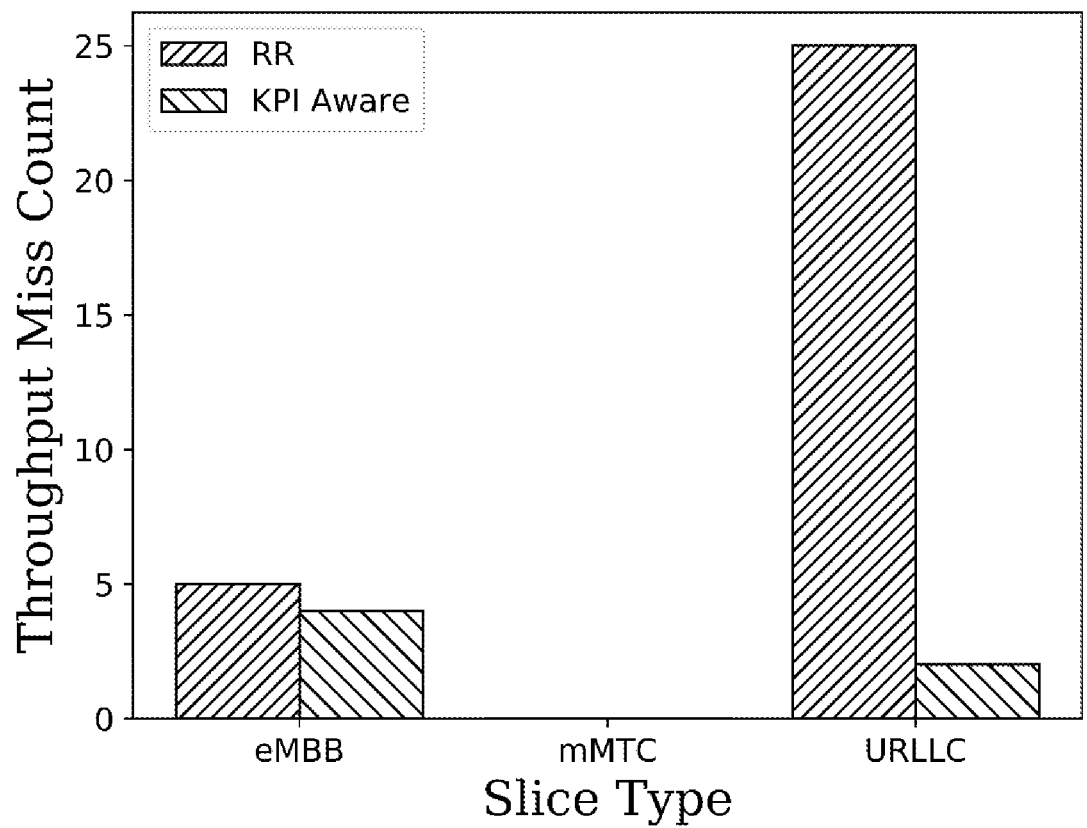

For the verification of method of the present disclosure, the system 100 considered 20 users randomly generating requests. These users can be of types eMBB, URLLC, or mMTC. The total available resources were assigned into three different parts according to their fractional population. After creation of slices for different application types, users are allocated for resources. Note that, an eMBB user can consume from only the eMBB slice portion. As users are being scheduled on frame-by-frame basis, which type of users is scheduled first depends on the specific algorithms used. During experiments/simulation, two such allocation schemes were used by the system 100 of the present application, (i) Round Robin (RR) and (ii) KPI-Aware. The process of allocation continues for multiple iterations. Desired KPI requirements were set in terms of delay and throughput for all application types. If for a specific user the desired KPI values are achieved in an iteration, then it is termed as a hit for that KPI. Otherwise, it is termed as a miss. FIGS. 4A and 4B, with reference to FIGS. 1 through 3, depict graphical representation illustrating delay hit and miss percentage for Round Robin (RR) and KPI-aware allocation schemes, in accordance with an embodiment of the present disclosure. Similarly, FIGS. 5A and 5B, with reference to FIGS. 1 through 4B, depict graphical representation illustrating throughput hit and miss percentage for Round Robin (RR) and KPI-aware allocation schemes, in accordance with an embodiment of the present disclosure. As it can be evident from FIGS. 4A through 5B, by applying the slice creation and allocation method as described in FIG. 3, miss percentage can be reduced significantly. Moreover, in several scenarios, KPI-aware allocation gives higher hit percentage than RR allocation scheme. This is because in KPI-aware, the system 100 schedules as per the KPI budgets.

Figure 6A:
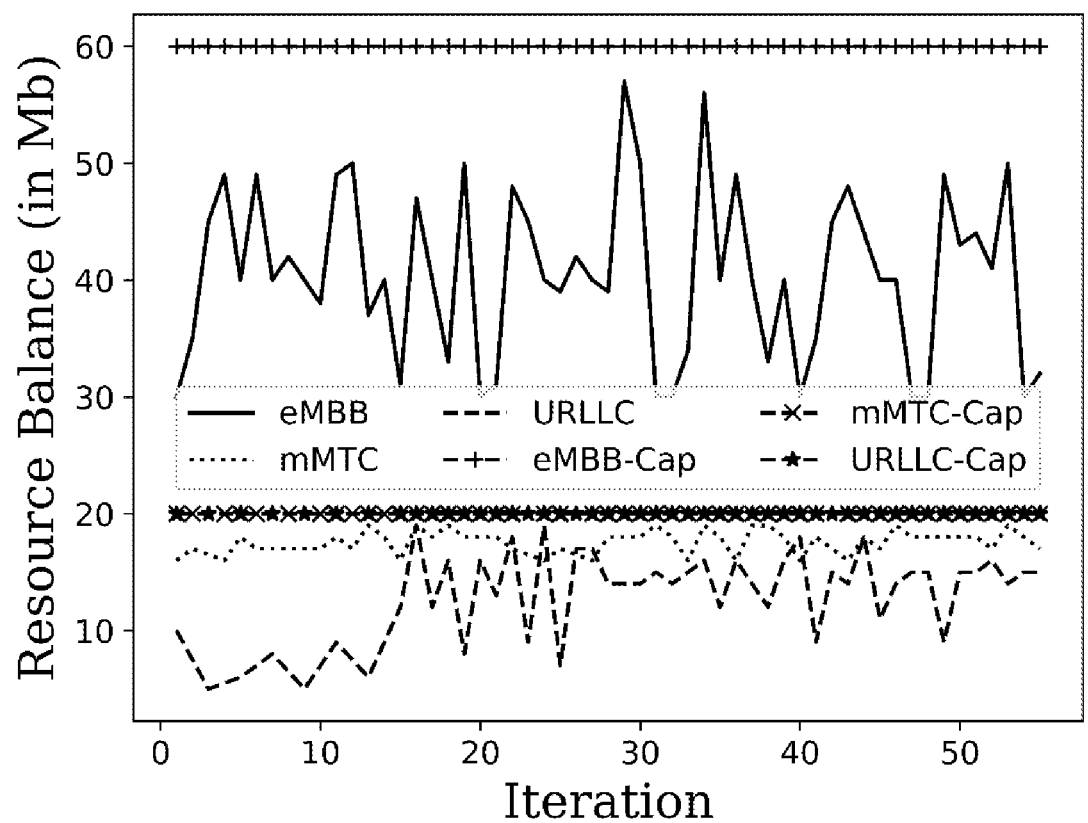
FIGS. 6A and 6B depict graphical representation illustrating an instantaneous average balance resource profile for each of the iterations, in accordance with an embodiment of the present disclosure.
Figure 6B:
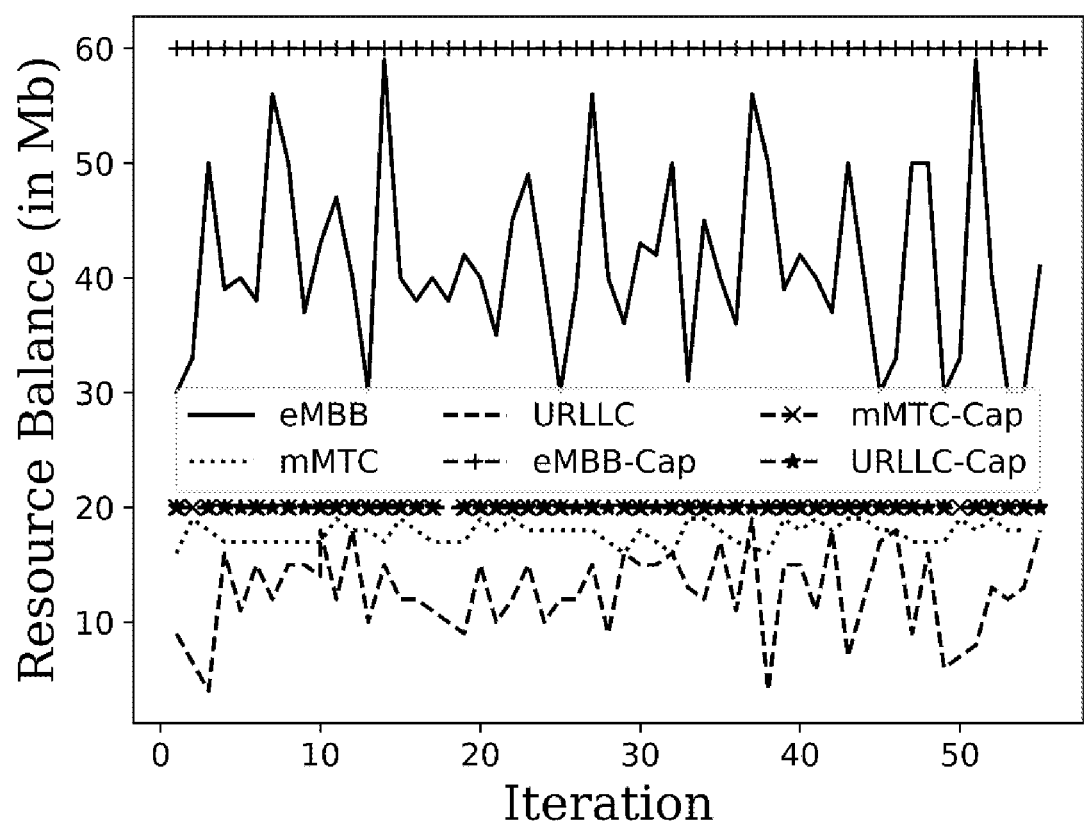
Figure 7A:
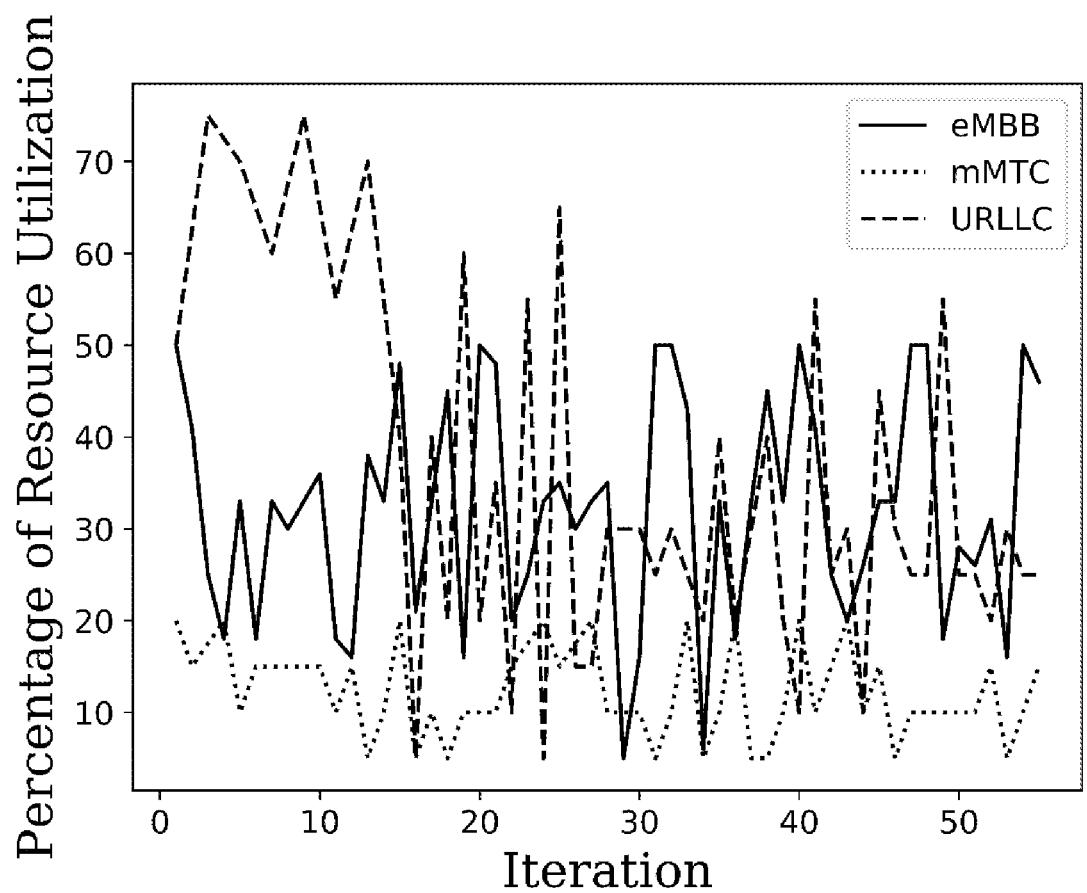
FIG. 7A depicts a graphical representation illustrating a resource balance profile for Round Robin (RR) scheme, in accordance with an embodiment of the present disclosure.
Figure 7B:
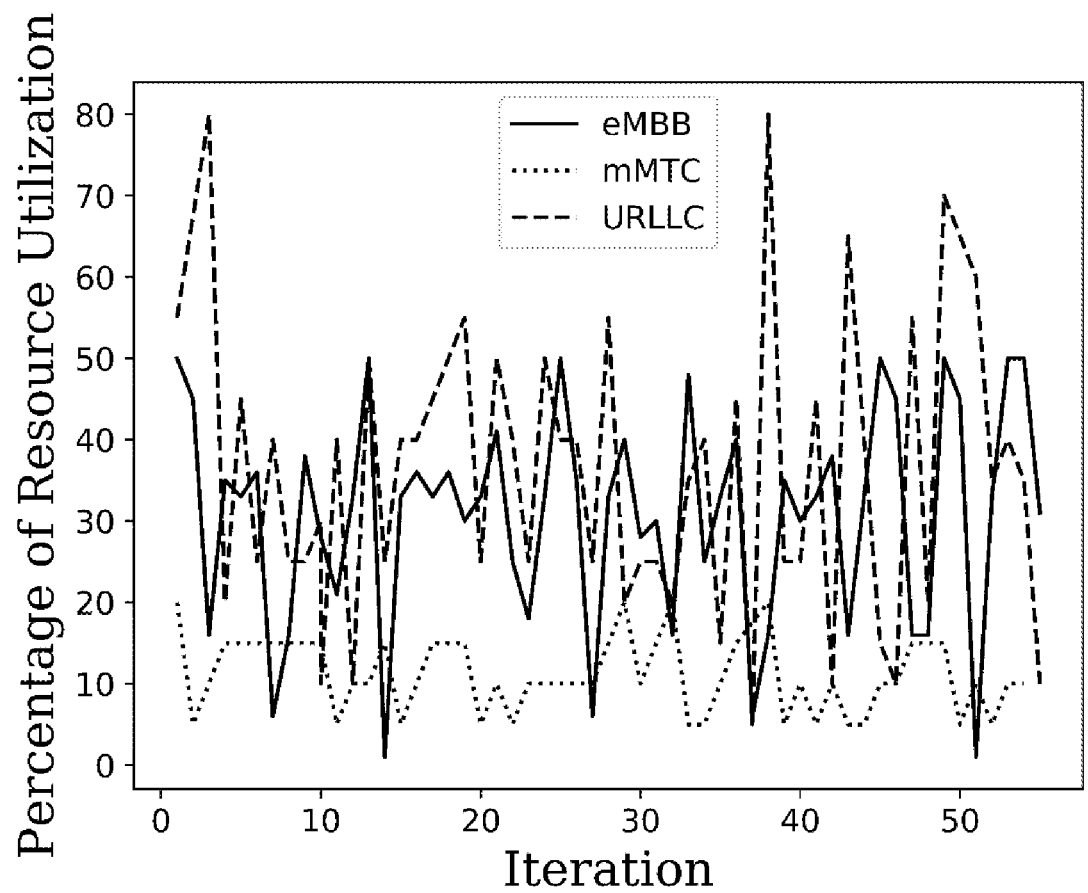
FIG. 7B depicts a graphical representation illustrating a balance report for the KPI-aware allocation scheme, in accordance with an embodiment of the present disclosure.

FIGS. 6A and 6B, with reference to FIGS. 1 through 5B, depict graphical representation illustrating an instantaneous average balance resource profile for each of the iterations, in accordance with an embodiment of the present disclosure. While 7A, with reference to FIGS. 1 through 6B, depicts a graphical representation illustrating a resource balance profile for the RR scheme, FIG. 7B, with reference to FIGS. 1 through 7A, depicts a graphical representation illustrating a balance report for the KPI-aware allocation scheme, in accordance with an embodiment of the present disclosure. Graph for instantaneous balance resource is plotted against the maximum resource capacity (Cap) set against each of the application types. For instance, resource cap for the eMBB, URLLC, mMTC type are 60, 20 and 20 units, respectively. The balance resource values are always less than the Cap because of the lesser number of users in the system. Similarly, the average percentage of resource utilization for different sCATs have shown in FIGS. 7A and 7B for RR and KPI-aware schemes, respectively. The utilization factor depends on traffic population.

Network slicing holds useful implications for the wide adaptation of 5G technologies into various industry sectors. With creation of different type of slices for different applications, cellular resources are expected to be managed more efficiently and dynamically. In the present application, systems and methods are provided for the control and management of slices. Firstly, the real-time as well as proactive/predictive model are well equipped to create slices as per the traffic demands. Secondly, using an inter-slice and intra-slice allocation schemes, resource utilization is maximized with the minimum resource wastage. The method has been validated and tested with extensive simulation-based prototype results which are depicted by way of graphical representations in FIGS. 4A through 7B.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method, comprising:
periodically obtaining, by a network slicing, control, and management system (NSCMS), (i) one or more uplink data requests associated with one or more user equipment, the one or more user equipment is connected to an enhanced node, and (ii) a list of available radio access network (RAN) resources;
identifying, by the NSCMS, the one or more uplink data requests, the one or more uplink data requests comprising one of a first demands request, and a second demand request, wherein the first demand request comprises a predictive demand request, wherein the second demand request comprises a real-time demand request, and wherein requirement of the real-time demand request depends on instantaneous or immediate future of traffic demands, and in the predictive demand request, predictive slicing for user demands is forecasted; and
iteratively performing:
dynamically slicing, by the NSCMS, one or more available RAN resources into a plurality of sliced RAN resources based on the one or more identified requests;
allocating, by the NSCMS, the one or more user equipment on a corresponding sliced RAN resource from the plurality of sliced RAN resources based on an inter slice allocation and an intra slice allocation, wherein the inter slice allocation selects a specific application that needs to be scheduled based on one or more key performance indicators, KPIs, and to schedule a sliced RAN resource for the specific application, wherein the intra slice allocation schedules the one or more user equipment attempting for the sliced RAN resource after the sliced RAN resource for the specific application is scheduled, wherein the specific application correspond to at least one of an enhanced mobile broadband, eMBB, application type, an ultra-reliable low latency, URLLC, application type, and a massive machine type communication, mMTC, application type, and wherein the steps of dynamic slicing and allocation is performed till all of the one or more user equipment from all application types are allocated; and
monitoring, by the NSCMS, the plurality of sliced RAN resources to obtain information specific to performance degradation based on at least one of (i) allocation of the one or more available RAN resources, (ii) change in traffic pattern, and (iii) wireless characteristics, until one or more parameters associated with the plurality of sliced RAN resources reach a pre-defined threshold.

2. The processor implemented method of claim 1, wherein when the one or more identified requests are of the first demand request, the dynamic step of slicing, of the one or more available RAN resources into the plurality of sliced RAN resources is based on a historical sliced based dataset.

3. The processor implemented method of claim 1, wherein the plurality of sliced RAN resources is one of an enhanced mobile broadband (eMBB) sliced resource, an ultra-reliable low latency (URLLC) sliced resource, or a massive machine type communication (mMTC) sliced resource.

4. The processor implemented method of claim 1, wherein the step of allocating using the inter slice allocation, by the NSCMS, the one or more user equipment on a corresponding sliced RAN resource from the plurality of sliced RAN resources is based on the one or more KPIs key performance indicators associated with an uplink data request of the one or more user equipment.

5. The processor implemented method of claim 4, wherein the one or more user equipment are allocated on a corresponding sliced RAN resource from the plurality of sliced RAN resources based on an average KPI demand associated with a corresponding application type.

6. The processor implemented method of claim 1, wherein the step of allocating using the intra slice allocation, by the NSCMS, the one or more user equipment on a corresponding sliced RAN resource from the plurality of sliced RAN resources comprises:
prioritizing at least a subset of user equipment corresponding to a specific application from the one or more user equipment having the one or more applications for allocation on the corresponding sliced RAN resource from the plurality of sliced RAN resources based on a KPI demand of the specific application corresponding to a user equipment.

7. The processor implemented method of claim 1, wherein the one or more parameters associated with the plurality of sliced RAN resources comprise at least one of resource utilization, and resource wastage.

8. A network slicing, control, and management system (NSCMS), comprising:
a memory storing instructions;
one or more communication interfaces; and
one or more hardware processors coupled to the memory via the one or more communication interfaces, wherein the one or more hardware processors are configured by the instructions to:
periodically obtain (i) one or more uplink data requests associated with one or more user equipment, the one or more user equipment is connected to an enhanced node, and (ii) a list of available radio access network (RAN) resources;
identify the one or more uplink data requests, the one or more uplink data requests comprising one of a first demand request, and a second demand request, wherein the first demand request comprises a predictive demand request, wherein the second demand request comprises a real-time demand request, and wherein requirement of the real-time demand request depends on instantaneous or immediate future of traffic demands, and in the predictive demand request, predictive slicing for user demands is forecasted; and iteratively perform:
dynamically slice of one or more available RAN resources into a plurality of sliced RAN resources based on the one or more identified requests;
allocate the one or more user equipment on a corresponding sliced RAN resource from the plurality of sliced RAN resources, based on an inter slice allocation and an intra slice allocation, wherein the inter slice allocation selects a specific application that needs to be scheduled based on one or more key performance indicators, KPIs, and to schedule a sliced RAN resource for the specific application, wherein the intra slice allocation schedules the one or more user equipment attempting for the sliced RAN resource after the sliced RAN resource for the specific application is scheduled, wherein the specific application correspond to at least one of an enhanced mobile broadband, eMBB, application type, an ultra-reliable low latency, URLLC, application type, and a massive machine type communication, mMTC, application type, and wherein the steps of dynamic slicing and allocation is performed till all of the one or more user equipment from all application types are allocated; and
monitor the plurality of sliced RAN resources to obtain information specific to performance degradation based on at least one of (i) allocation of the one or more available RAN resources, (ii) change in traffic pattern associated thereof, and (iii) wireless characteristics associated thereof,
until one or more parameters associated with the plurality of sliced RAN resources reach a predefined threshold.

9. The system as claimed in claim 8, wherein when the one or more identified requests are of the first demand request, the dynamic slicing, of the one or more available RAN resources into the plurality of sliced RAN resources is based on a historical sliced based dataset.

10. The system as claimed in claim 8, wherein the plurality of sliced RAN resources is one of an enhanced mobile broadband (eMBB) sliced resource, an ultra-reliable low latency (URLLC) sliced resource, or a massive machine type communication (mMTC) sliced resource.

11. The system as claimed in claim 8, wherein the step of allocating, using the inter slice allocation, the one or more user equipment on a corresponding sliced RAN resource from the plurality of sliced RAN resources is based on the one or more KPIs associated with an uplink data request of the one or more user equipment.

12. The system as claimed in claim 11, wherein the one or more user equipments are allocated on a corresponding sliced RAN resource from the plurality of sliced RAN resources based on an average KPI demand associated with a corresponding application type.

13. The system as claimed in claim 8, wherein for the step of allocating, using the intra slice allocation, by the NSCMS, the one or more user equipment on a corresponding sliced RAN resource from the plurality of sliced RAN resources, the one or more hardware processors are configured by the instructions to:
prioritize at least a subset of user equipment corresponding to a specific application from the one or more user equipment having the one or more applications for allocation on the corresponding sliced RAN resource from the plurality of sliced RAN resources based on a KPI demand of the specific application corresponding to a user equipment.

14. The system as claimed in claim 8, wherein the one or more parameters associated with the plurality of sliced RAN resources comprise at least one of resource utilization, and resource wastage.

15. One or more non-transitory machine-readable information storage mediums comprising one or more instructions which when executed by one or more hardware processors cause a method for application-aware dynamic slicing in radio access network (RAN) comprising:
periodically obtaining, by a network slicing, control, and management system (NSCMS), (i) one or more uplink data requests associated with one or more user equipment, the one or more user equipment is connected to an enhanced node, and (ii) a list of available radio access network (RAN) resources;
identifying, by the NSCMS, the one or more uplink data requests, the one or more uplink data requests, and a second demand request to obtain one or more identified demand requests, wherein the first demand request comprises a predictive demand request, wherein the second demand request comprises a real-time demand request, and wherein requirement of the real-time demand request depends on instantaneous or immediate future of traffic demands, and in the predictive demand request, predictive slicing for user demands is forecasted; and
iteratively performing:
dynamically slicing, by the NSCMS, one or more available RAN resources into a plurality of sliced RAN resources based on the one or more identified requests;
allocating, by the NSCMS, the one or more user equipment on a corresponding sliced RAN resource from the plurality of sliced RAN resources based on an inter slice allocation and an intra slice allocation, wherein the inter slice allocation selects a specific application that needs to be scheduled based on one or more key performance indicators, KPIs, and to schedule a sliced RAN resource for the specific application, wherein the intra slice allocation schedules the one or more user equipment attempting for the sliced RAN resource after the sliced RAN resource for the specific application is scheduled, wherein the specific application correspond to at least one of an enhanced mobile broadband, eMBB, application type, an ultra-reliable low latency, URLLC, application type, and a massive machine type communication, mMTC, application type, and wherein the steps of dynamic slicing and allocation is performed till all of the one or more user equipment from all application types are allocated; and monitoring, by the NSCMS, the plurality of sliced RAN resources to obtain information specific to performance degradation based on at least one of (i) allocation of the one or more available RAN resources, (ii) change in traffic pattern, and (iii) wireless characteristics, until one or more parameters associated with the plurality of sliced RAN resources reach a pre-defined threshold.

16. The or more non-transitory machine-readable information storage mediums of claim 15, wherein when the one or more identified demand requests are of the first demand request, the dynamic slicing, of the one or more available RAN resources into the plurality of sliced RAN resources is based on a historical sliced based dataset.

17. The one or more non-transitory machine-readable information storage mediums of claim 15, wherein the plurality of sliced RAN resources is one of an enhanced mobile broadband (eMBB) sliced resource, an ultra-reliable low latency (URLLC) sliced resource, or a massive machine type communication (mMTC) sliced resource.

18. The one or more non-transitory machine-readable information storage mediums of claim 15, wherein the step of allocating using the inter slice allocation, by the NSCMS, the one or more user equipment on a corresponding sliced RAN resource from the plurality of sliced RAN resources is based on the one or more KPIs associated with an uplink data request of the one or more user equipment.

19. The one or more non-transitory machine-readable information storage mediums of claim 18, wherein the one or more user equipment are allocated on a corresponding sliced RAN resource from the plurality of sliced RAN resources based on an average KPI demand associated with a corresponding application type.

20. The one or more non-transitory machine-readable information storage mediums of claim 15, wherein the one or more parameters associated with the plurality of sliced RAN resources comprise at least one of resource utilization, and resource wastage.

* * * * *